Dec. 4, 1934.　　　R. W. STEWART　　　1,983,105
MOTOR VEHICLE LICENSE PLATE LOCK
Filed June 26, 1934　　2 Sheets-Sheet 1
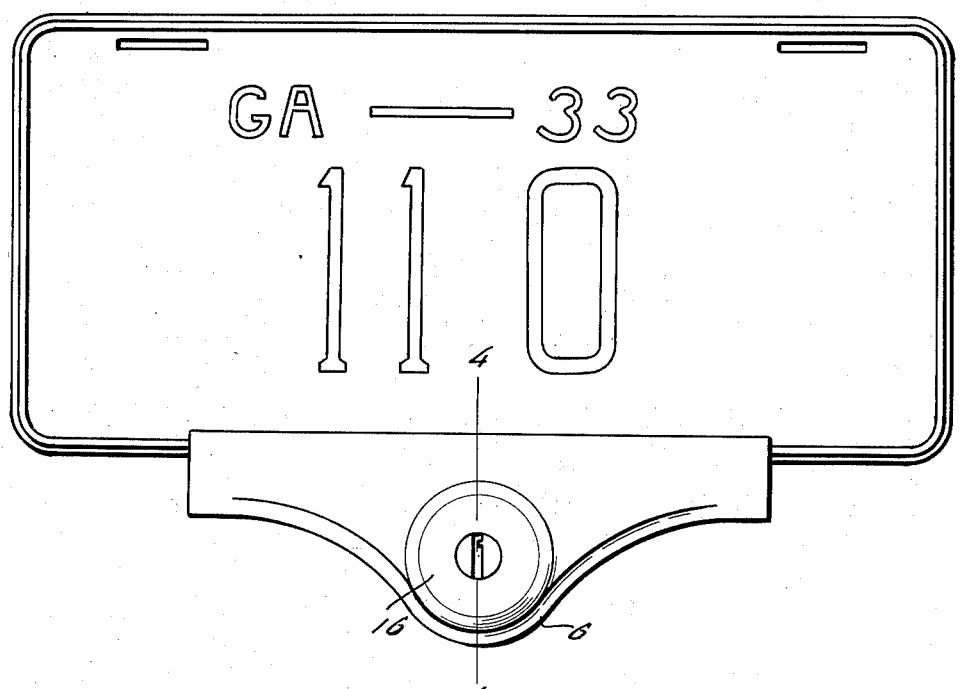
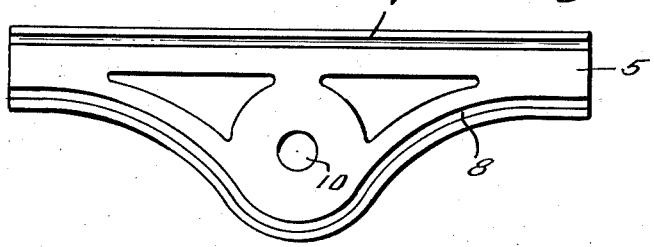
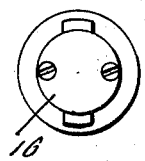
Inventor
R. W. Stewart
By Clarence A. O'Brien
Attorney Dec. 4, 1934.  R. W. STEWART  1,983,105
MOTOR VEHICLE LICENSE PLATE LOCK
Filed June 26, 1934  2 Sheets-Sheet 2
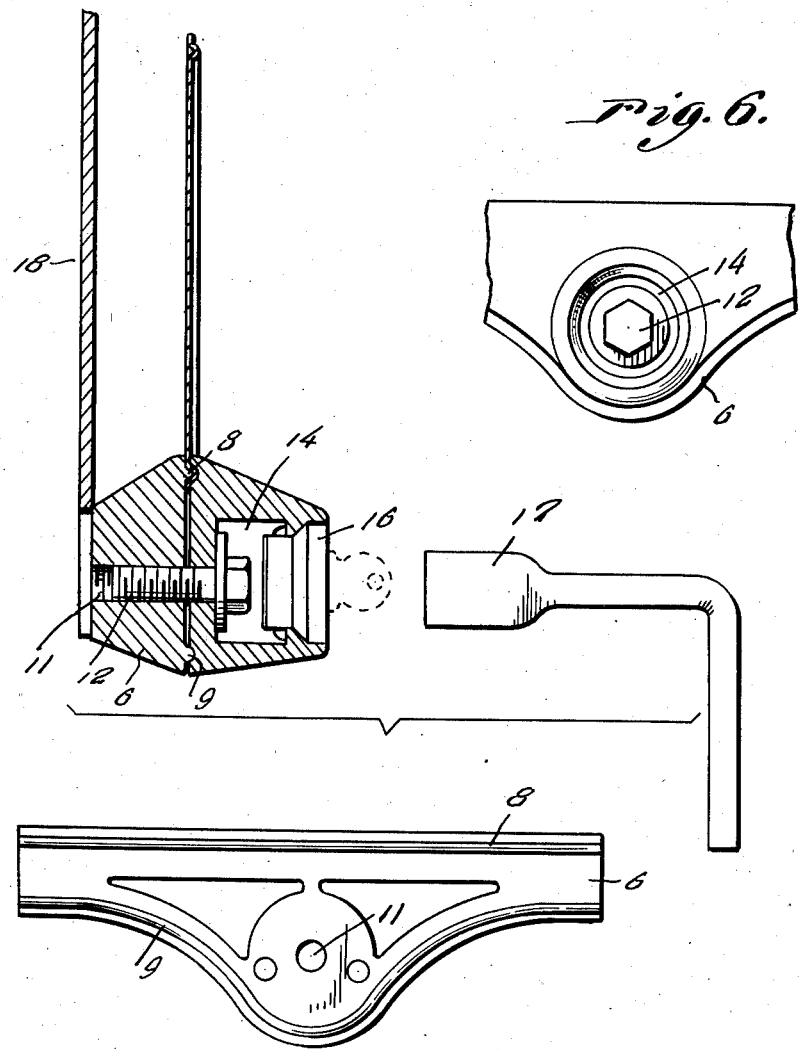
Inventor
R. W. Stewart
By Clarence A. O'Brien
Attorney Patented Dec. 4, 1934

1,983,105

UNITED STATES PATENT OFFICE 1,983,105

MOTOR VEHICLE LICENSE PLATE LOCK

Robert W. Stewart, Apalachicola, Fla.

Application June 26, 1934, Serial No. 732,496

1 Claim. (Cl. 40—125)

The present invention relates to a lock for securing license tags on motor vehicles to prevent the loss and theft thereof.

It is the object of the invention to provide a lock of this nature which is simple in its construction, inexpensive to manufacture, strong and durable, thoroughly efficient and reliable in use and otherwise well adapted to the purpose for which it is designed.

With the above and numerous other objects in view as will appear as the description proceeds, the invention consists in certain novel features of construction, and in the combination and arrangement of parts as will hereinafter be more fully described and claimed.

In the drawings:

Figure 1 is an elevation of the lock showing the same engaged on a license plate.

Figure 2 is an inside elevation of one of the block members.

Figure 3 is an elevation of the plug lock.

Figure 4 is a detail sectional view taken substantially on the line 4—4 of Figure 1.

Figure 5 is an inside elevation of the other block member.

Figure 6 is a detail elevation of the outer block member with the plug lock removed.

Referring to the drawings in detail it will be seen that numerals 5 and 6 denote complemental oblong blocks, the inner face of the block 5 having a groove 7 along one edge to receive the bead of the license plate and the block 6 has a similarly disposed rib 8 to engage in said bead. The block 5 on its inner face is provided adjacent its other edge with a curved groove 8 to receive a curved rib 9 similarly positioned on the block 6. Openings 10 and 11 in the center portions of the blocks 5 and 6 respectively are adapted to register with each other. A bolt extends through the opening 10 and is threaded into the opening 11. The head of the bolt 12 is located in a recess 14 adapted to be closed by a plug lock 16 so as to prevent access to the head of the bolt. The owner with his key, of course, can remove the plug lock 16 and then a wrench 17 may be used for removing the bolt and releasing the license plate. The block 6 is adapted to be welded or formed integrally with the vehicle bracket 18.

It is thought that the construction, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

A license plate holder of the class described comprising a fixed oblong block member, a removable complementary oblong block member, the inner faces of the block members having interfitting ribs and grooves, one of the ribs and the complemental groove being adapted to receive the beaded bottom edge or upper edge of a license tag, a bolt extending through an opening in the removable block and threadedly engaged in the fixed block, said removable block being provided with a recess in which the head of the bolt will be located when the parts are secured together, and a plug lock for disposition into the recess to close the same and prevent unauthorized access to the head of the bolt.

ROBERT W. STEWART.